May 8, 1951    N. W. KNEWSTUBB ET AL    2,552,285
MANUFACTURE OF COMPOSITE MATERIAL CONTAINING
ONE OR MORE ALUMINUM COMPONENTS
Filed April 10, 1945
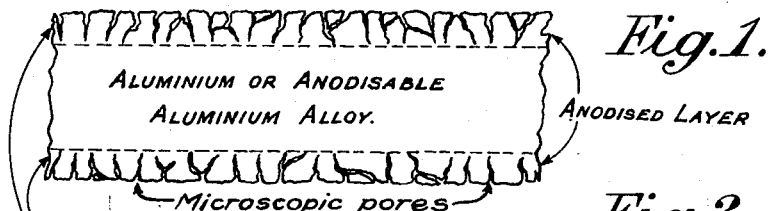
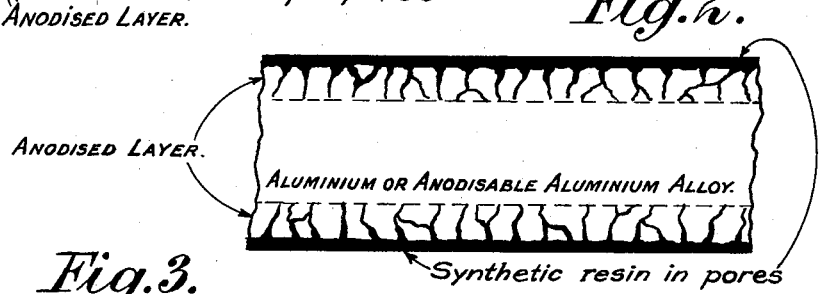
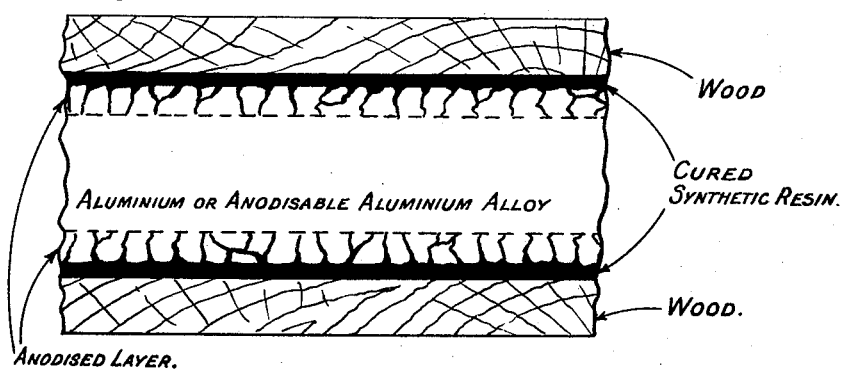
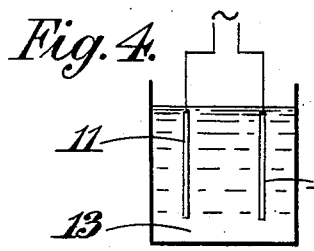 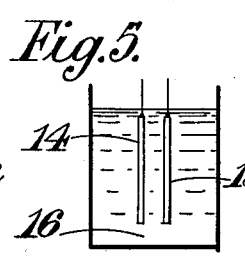 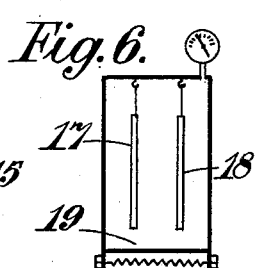
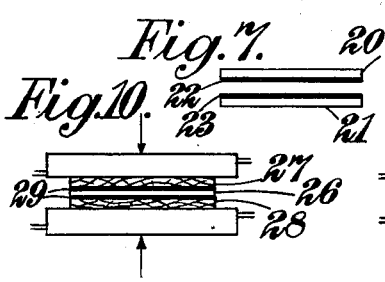 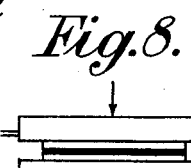
INVENTORS
NORMAN WATSON KNEWSTUBB
ARCHIBALD MONCRIEFF JAMIESON
BY Donald C. Harrison
ATTORNEY Patented May 8, 1951

2,552,285

UNITED STATES PATENT OFFICE 2,552,285

MANUFACTURE OF COMPOSITE MATERIAL CONTAINING ONE OR MORE ALUMINUM COMPONENTS

Norman Watson Knewstubb, Birmingham, England, and Archibald Moncrieff Jamieson, Aberlady, East Lothian, Scotland, assignors to Union Carbide and Carbon Corporation, New York, N. Y., a corporation of New York Application April 10, 1945, Serial No. 587,496
In Great Britain April 4, 1944

6 Claims. (Cl. 154—129)

This invention is for improvements in or relating to the manufacture of composite material containing one or more aluminium components which are bonded with synthetic resin adhesives.

For many structural, electrical and decorative purposes it is advantageous to employ composite materials which contain aluminium components bonded either to similarly constituted components, or to other materials, e. g. to fibrous materials such as wood or paper. Thus, in aeronautical construction, by securing an aluminium sheet between wood veneers it is possible to combine in the composite product the strength of the metal sheet with the surface characteristics of wood.

It is an object of the present invention to prepare composite materials containing one or more aluminium components in which the adhesion is strong and consistent and unimpaired over a wide range of operative conditions.

We have found that when aluminium or an anodisable aluminium alloy is anodised its surfaces are rendered porous to some extent to synthetic resins as is shown diagrammatically in Figures 1 and 2 of the accompanying drawing and that the anodised and resin-treated aluminium surfaces may then be effectively bonded to other surfaces, e. g. to fibrous surfaces, such as to surfaces of wood veneers as is shown in Figure 3 of the drawing.

According to the present invention, there is provided a process for the manufacture of a composite article containing one or more aluminium components which process comprises anodising the aluminium at least on that surface or on those surfaces which are to be bonded, applying synthetic resin to the anodised surface or surfaces before said surfaces have lost their absorbency and thereafter bonding the treated surface to at least one other surface (which may be a similarly treated aluminium surface) with a synthetic resin adhesive.

Instead of using aluminium itself it is possible to use an anodisable aluminium alloy and preferably a readily anodisable alloy such as Duralumin.

The synthetic resin may be a thermoplastic one, such as an alkyd resin or polyvinyl acetate, or it may be thermosetting, such as, for example, the condensation product made by reacting a phenol with a molecular excess of aqueous formaldehyde in the presence of alkali. The synthetic resin is preferably applied to the anodised aluminium surface in liquid form, such as a solution of the resin in volatile solvent, as a liquid resin (e. g. a partially condensed reaction product of phenol and formaldehyde) or as the fused resin.

The synthetic resin with which the anodised aluminium surface is treated may comprise the sole adhesive for securing the aluminium to the adjacent surface, or, alternatively, an additional adhesive may be employed.

In a preferred form of the invention, the anodised aluminium surface is treated with a thermosetting adhesive, e. g. of the phenol-formaldehyde type and is subsequently heated to advance the resin partly to the infusible stage.

The elements of the composite materials may comprise two or more aluminium elements, all of which are preferably anodised and treated with synthetic resin. In other modifications of the process the treated aluminium may be cemented to a fibrous component or to fibrous components which may themselves be bonded, e. g. with synthetic resin. Thus, a sheet of aluminium may be secured between two veneers, or an aluminium sheet may be included in a laminated product consisting of paper or of fabric sheets bonded with synthetic resin. If in such a product the aluminium sheet is located near the surface, a heat-dissipating effect is imparted to this surface.

Following is a description by way of example and with reference to Figures 4 to 10 of the accompanying diagrammatic drawings of methods of carrying the invention into effect.

Example I

This example describes the treatment of aluminium sheets prior to their incorporation into composite material. Aluminium sheets are degreased, washed and then anodised by assembling the sheets 11, 12 (Figure 4) as electrodes in an electrolytic bath 13 consisting of 5% solution of aqueous oxalic acid. Alternating current is applied with a current density of 20 amps. per square foot and a potential difference of 20 to 35 volts is maintained between the electrodes. The treatment is continued for 20 minutes and the anodised sheets 14, 15 (Figure 5), after washing in water, are immersed for 4 to 5 minutes in a 10% solution 16 in industrial spirit of a heat-hardening synthetic resin formed by the interaction of phenol and aqueous formaldehyde in the presence of an alkaline condensing agent. The treated sheets are removed, the excess resin solution drained off and the sheets 17, 18 heated for 10 minutes at 90° C. in an oven 19 (as shown in Figure 6), in order partly to harden the synthetic resin. The treated sheets are employed in the manufacture of a composite article as described in Example II.

*Example II*

Two sheets of aluminium treated as described in Example I are coated with a heat-hardening phenol-formaldehyde adhesive, the sheets 20, 21 (Figure 7) assembled with the adhesive-coated surfaces 22, 23 in contact and the assembly heated for 30 minutes at 140° C. under a pressure of 100 lbs./sq. in. in a heated press as shown in Figure 8. The phenol-formaldehyde adhesive may take the form of a liquid condensation product, a solution of the resin in volatile organic solvent, or of a film glue consisting of a sheet of paper, such as tissue paper, impregnated with phenol-formaldehyde adhesive.

*Example III*

This example describes the manufacture of a laminated product including a sheet of aluminium located near one surface, e. g. for the production of a sheet having heat-dissipating properties. A number of sheets of paper 25 (Figure 9) are impregnated with an alkali-condensed cresol-formaldehyde resin and superposed, a sheet of aluminium 24 treated as described in Example I being inserted near one surface of the stack. The stack, which if desired may for decorative purposes be surfaced with one or more sheets of paper treated with urea-formaldehyde resin binder, is heated for one hour at 125° C. at a pressure of 1,500 lbs./sq. in. to form a product having heat-dissipating properties.

*Example IV*

This example describes the preparation of a composite material comprising a sheet of aluminium secured between two wood veneers. A sheet of aluminium 26 (Figure 10) anodised and resin-treated as described in Example I is located between two birch veneers 27, 28 with sheets of the film glue 29 described in Example II interposed between the treated aluminium surfaces and the wood. The assembly is bonded by heating for 5 minutes at 140° C. under a pressure of 250 lbs./sq. in. The resulting light-weight composite panel combines the strength of aluminium with the surface appearance and the ability of plywood to be glued and mechanically worked.

We claim:

1. Process for the manufacture of a bonded composite sheet-laminate article containing an aluminous sheet material as one component which comprises providing a bonding interface by subjecting a surface of the component as an electrode in an electrolytic bath of oxalic acid to the action of alternating current to render the surface porous and substantially immediately applying synthetic resin to the treated surface before absorbency for the resin is lost, and bonding thereto a second sheet component to form the composite article.

2. Process for the manufacture of a composite sheet-laminate article containing aluminous sheet material as one component which comprises providing a bonding interface by anodizing a surface of the component to render the surface porous and substantially immediately sealing the treated surface by a synthetic resin coating before absorbency for the resin is lost, and bonding thereto a second sheet component to form the composite article.

3. Process according to claim 2 in which the second component is a fibrous material.

4. Process according to claim 2 in which the resin coating is a thermosetting resin applied in solution to the anodized surface and dried.

5. Process according to claim 2 in which the resin is a thermosetting resin and partially advanced by heating after applying.

6. Process according to claim 2 in which the second component is bonded to the first by an adhesive separately applied to the resin-treated first component.

NORMAN WATSON KNEWSTUBB.
ARCHIBALD MONCRIEFF JAMIESON.

REFERENCES CITED

The following references are of record in the file of this patent:

UNITED STATES PATENTS

| Number | Name | Date |
|---|---|---|
| 1,972,307 | Loetscher | Sept. 4, 1934 |
| 2,137,988 | Hempel | Nov. 22, 1938 |
| 2,138,419 | Gavin | Nov. 29, 1938 |
| 2,174,840 | Robinson et al. | Oct. 3, 1939 |

FOREIGN PATENTS

| Number | Country | Date |
|---|---|---|
| 457,037 | Great Britain | Nov. 20, 1936 |
| 462,269 | Great Britain | Mar. 5, 1937 |
| 497,976 | Great Britain | Jan. 2, 1939 |